United States Patent
Sanders et al.

(10) Patent No.: US 10,914,587 B1
(45) Date of Patent: Feb. 9, 2021

(54) SYSTEMS AND METHODS FOR CORRECTING ERRORS IN GYROSCOPES

(71) Applicant: Honeywell International Inc., Morris Plains, NJ (US)

(72) Inventors: Glen A. Sanders, Scottsdale, AZ (US); Lee K. Strandjord, Tonka Bay, MN (US); Tiequn Qiu, Glendale, AZ (US); Marc Smiciklas, Phoenix, AZ (US); Norman Gerard Tarleton, Glendale, AZ (US)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/519,768

(22) Filed: Jul. 23, 2019

(51) Int. Cl.
    *G01C 19/72* (2006.01)
(52) U.S. Cl.
    CPC ........... *G01C 19/721* (2013.01); *G01C 19/72* (2013.01); *G01C 19/726* (2013.01); *G01C 19/727* (2013.01)
(58) Field of Classification Search
    CPC .... G01C 19/721; G01C 19/726; G01C 19/72; G01C 19/727
    See application file for complete search history.

(56) References Cited

U.S. PATENT DOCUMENTS

| | | | |
|---|---|---|---|
| 7,362,443 B2 | 4/2008 | Sanders et al. | |
| 7,372,574 B2 | 5/2008 | Sanders et al. | |
| 7,912,664 B2 | 3/2011 | Rozelle | |
| 8,583,371 B1* | 11/2013 | Goodzeit | G01C 25/005 |
| | | | 701/501 |
| 9,772,189 B2 | 9/2017 | Strandjord et al. | |
| 2007/0097374 A1 | 5/2007 | Ren-Young | |
| 2014/0240712 A1* | 8/2014 | Strandjord | G01C 19/727 |
| | | | 356/461 |
| 2018/0066961 A1* | 3/2018 | Trusov | G01C 21/18 |
| 2019/0056426 A1* | 2/2019 | Chandel | G01C 19/5776 |

OTHER PUBLICATIONS

"Temperature Dependence of the Kerr Effect in a Silica Optical Fibre", Electronics Letters, Oct. 13, 1983, pp. 890-891, vol. 19, No. 21.

* cited by examiner

*Primary Examiner* — Jonathan M Hansen
(74) *Attorney, Agent, or Firm* — Fogg & Powers LLC

(57) ABSTRACT

Techniques are provided for correcting for time varying changes to a gyroscope incorporating a resonator and/or to an environment in which the gyroscope is located, and which affect the resonator. Free spectral range of the gyroscope, which varies with such changes, is determined and is used to correct at least one of gyroscope bias and scale factor.

20 Claims, 8 Drawing Sheets

SYSTEMS AND METHODS FOR CORRECTING ERRORS IN GYROSCOPES

U.S. GOVERNMENT LICENSE RIGHTS

This invention was made with Government support under Government Contract No. FA9453-18-C-0045 awarded by AFRL. The Government has certain rights in the invention.

BACKGROUND

The resonator fiber optic gyroscope (RFOG) is a navigation gyroscope that has a combination of low cost, small package size, and weight. The RFOG uses at least two optical signals, where one optical signal propagates around a resonator in the clockwise (CW) direction and the other optical signal propagates in the counter-clockwise (CCW) direction. In the operation of a resonant fiber optic gyroscope (RFOG), it is desirable to lock the frequencies of the laser light sources generating each of the CW and CCW optical signals to corresponding resonance frequencies of the resonator in the CW and CCW optical signal paths.

Typically, the resonator is a ring resonator comprising a coil of optical fiber with layers of windings. The length of the optical fiber used in the coil may be many meters, and the coil may comprise many layers of the optical fiber. Further, the optical fiber comprises a core covered by cladding.

RFOGs are susceptible to errors which vary with temperature of the core of the optical fiber of the resonator. One such error occurs in bias which represents an offset error in measured rotation rate. For example, with zero rotation rate, a RFOG may indicate rotation that is due to such bias error. Bias varies in an RFOG with a resonator that is a coil of optical fiber due to several effects, many of which can be temperature sensitive, including for example, the non-linear Kerr effect or the magneto-optical Faraday Effect. In the former case, the Kerr effect introduces a bias proportional to a power difference between counterpropagating beams, which is temperature dependent. Even though RFOG designs attempt to equalize power of the CW and CCW optical signals, it may be impractical to perfectly equalize them, resulting in a bias that varies with temperature. Similarly, biases driven by magnetic fields may be mostly addressed by magnetic shielding and by maintaining linearly polarized light in the fiber, but adequate cancellation of the bias may be impractical. Since the Verdet constant of fiber varies with temperature, any residual bias due to static magnetic fields will be temperature dependent. In many RFOGs a temperature transient is also known to cause a transient bias change that varies according to the time rate of change of the temperature. Thus, variations in bias arise due to temperature or temperature rates of change, of the core of the optical fiber used to form the coil. Another error occurs in scale factor which is multiplied by, e.g. a difference in clockwise and counterclockwise resonance frequencies of an RFOG resonator, to obtain rotation rate.

To compensate for such temperature variant errors arising from the resonator, the temperature of a RFOG's resonator is measured. Because of the cladding and many layers of the optical fiber, the average temperature of the core of the optical fiber coil cannot be accurately measured. As a result, the model directly relying upon temperature cannot accurately compensate for bias as temperature varies.

SUMMARY

A method is provided for correcting rotation rate output from a gyroscope due to at least one time varying parameter of at least one of a gyroscope and the gyroscope's environment. The method comprises: determining free spectral range (FSR) and rotation rate frequency shift for a rotation around a center axis of a resonator of a resonant fiber optic gyroscope (RFOG); determining a corrected rotation rate frequency shift for a rotation around the center axis of the resonator of a resonant fiber optic gyroscope (RFOG) using the determined free spectral range frequency, the determined rotation rate frequency shift, and at least one of a: bias model dependent upon the at least one time varying parameter and a scale factor model dependent upon the at least one time varying parameter.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the invention described herein pertain to compensating for time varying changes to a gyroscope incorporating a resonator and/or to an environment in which the gyroscope is located, and which affect the resonator. For pedagogical purposes, the invention is described with respect to an RFOG, but applies to other type of gyroscopes with a passive resonator—such as an on chip resonator. Further, the time varying changes to the gyroscope and its environment include, but are not limited to, gyroscope aging, humidity, ambient temperature, and ambient pressure.

Some RFOGs determine both rotation rate and resonator free spectral range (FSR) of the RFOG. The term free spectral range and free spectral range frequency may be used interchangeably.

Resonator FSR is inversely proportional to the average temperature of a resonator, e.g. the average temperature of the core of the fiber coil. Thus, in embodiments of the invention, resonator FSR can be used to generate model(s) that compensate for RFOG errors arising due to temperature variations. Further, FSR can be used with such model(s) to more accurately determine rotation rate by removing effects dependent upon resonator temperature. Such temperature effects may appear in RFOG bias and/or RFOG scale factor. Prior to describing embodiments of the invention, an exemplary RFOG configured to generate both rotation rate and FSR will be described.

One type of a RFOG that determines both angular rotation rate of a resonator around its center axis ($f_\Omega$) and free spectral range (FSR or $f_{FSR}$) of the RFOG is illustrated in U.S. Pat. No. 9,772,189 (the "'189 Patent"). The '189 Patent is incorporated by reference herein in its entirety. Other RFOG architectures can be used to determine both angular rotation rate of the resonator and free spectral range. For example, U.S. Pat. No. 7,372,574 (the '574 Patent) illustrates another RFOG architecture which does so. The '574 Patent is hereby incorporated by reference herein in its entirety.

Figure 1A:
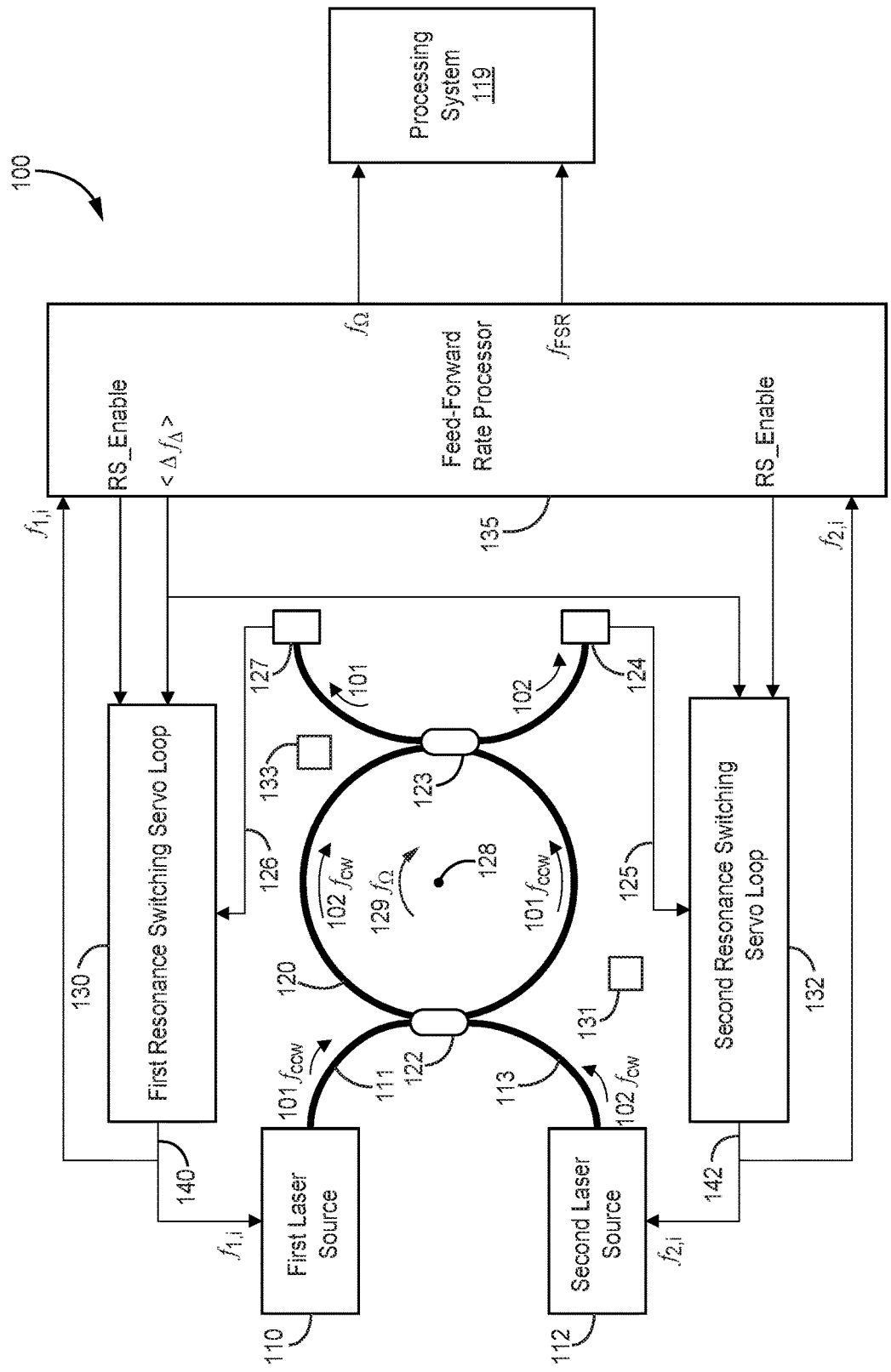
FIG. 1A is a block diagram of one embodiment of a resonator fiber optic gyroscope configured to generate both rotation rate and free spectral range.

The RFOG illustrated in the '189 Patent, however, will be illustrated for pedagogical purposes. FIG. 1A is a block diagram of one embodiment of a resonator fiber optic gyroscope (RFOG) 100 configured to generate both rotation rate and free spectral range. RFOG 100 comprises a first laser source 110 and second laser source 112 each coupled to a fiber optic resonator 120 by at least one first optical coupler 122. RFOG 100 further comprises a first resonance switching servo loop 130, a second resonance switching servo loop 132, and a feed-forward rate processor 135, each of which are discussed further below. The RFOG 100 may also compromise a processing system 119 coupled to the feed-forward rate processor 135; however, in other embodiments, the feed-forward rate processor 135 may be combined with the processing system 119, e.g. so that there is either only the feed-forward rate processor 135 or the processing system 119. The processing system 119 and the feed-forward rate processor 135 each comprise processing circuitry, e.g. processor circuitry coupled to memory circuitry, application specific integrated circuitry, gate array circuitry, and/or other circuitry. The processing system 119 and the feed-forward rate processor 135 may be alternatively referred to respectively as processing circuitry and feed-forward rate processing circuitry.

The resonator 120 of RFOG 100 is configured to rotate around a center axis 128. The rate of rotation (or rotation rate), Q, 129 measured by the RFOG 100 is a rate of rotation 129 of the resonator 120 around the center axis 128.

As shown in FIG. 1A, the first laser source 110 outputs a first optical signal 101 of laser light that is coupled into the resonator 120 by the at least one first optical coupler 122 and travels around the resonator 120 in a first direction. For the example of FIG. 1A, the first optical signal 101 is defined as traveling around the resonator 120 in a counter-clockwise (CCW) direction. The second laser source 112 outputs a second optical signal 102 of laser light that is coupled into the resonator 120 by the at least one first optical coupler 122 and travels around the resonator 120 in a second direction that is opposite to the first direction traveled by first optical signal 101. For the example of FIG. 1A, the second optical signal 102 is defined as traveling around the resonator 120 in a clockwise (CW) direction.

The first laser source 110 and the second laser source 112 are each respectively controlled by the first resonance switching servo loop 130 and the second resonance switching servo loop 132 to maintain the frequencies of the first optical signal 101 and the second optical signal 102 at resonance frequencies of the resonator 120. For example, the first laser source 110 launches the first optical signal 101 into the resonator 120 at a specific optical frequency (shown in FIG. 1A as fccw). At that frequency, fccw, the first optical signal 101 has a specific wavelength, λccw (which for laser light can be a wavelength on the order of 1.5 microns, for example). When the first optical signal 101 is tuned to a frequency fccw such that the CCW resonator length is exactly an integer multiple of wavelengths λccw propagating around the resonator 120, then the first optical signal 101 is said to be operating at a resonant frequency of the resonator 120 in the CCW direction (which can also be referred to as one of the resonant modes of the resonator 120). At this frequency, with each pass that the first optical signal 101 travels around the loop of the resonator 120, the first optical signal 101 is in phase with its previous pass and the optical power from each pass accumulates to a peak resonant intensity. Any deviation in fccw from a resonance frequency will cause optical power within the resonator 120 to sum to less than the peak resonant intensity.

In some embodiments, the first laser source 110 and the second laser source 112 are controlled respectively by the first resonance switching servo loop 130 and the second resonance switching servo loop 132 to remain locked to different resonance modes with respect to each other. That is, if the first optical signal 101 is locked to a resonant frequency foa (where an integer number, I, of wavelengths are propagating in the CCW direction around the resonator 120), then the second optical signal 102 is locked to a resonant frequency fob (where an integer number, J≠I, of wavelengths are propagating in the CW direction around the resonator 120).

Adjacent resonant frequencies are separated from each other based on a function of the free spectral range (FSR) of the resonator 120, a difference referred to herein as $f_{FSR}$. As such, when foa is less than fob by exactly one $f_{FSR}$, then the second optical signal 102 is said to be operating at the next higher resonant mode than the first optical signal 101, and the first optical signal 101 is said to be operating at the next lower resonant mode than the first optical signal 102.

Figure 1B:
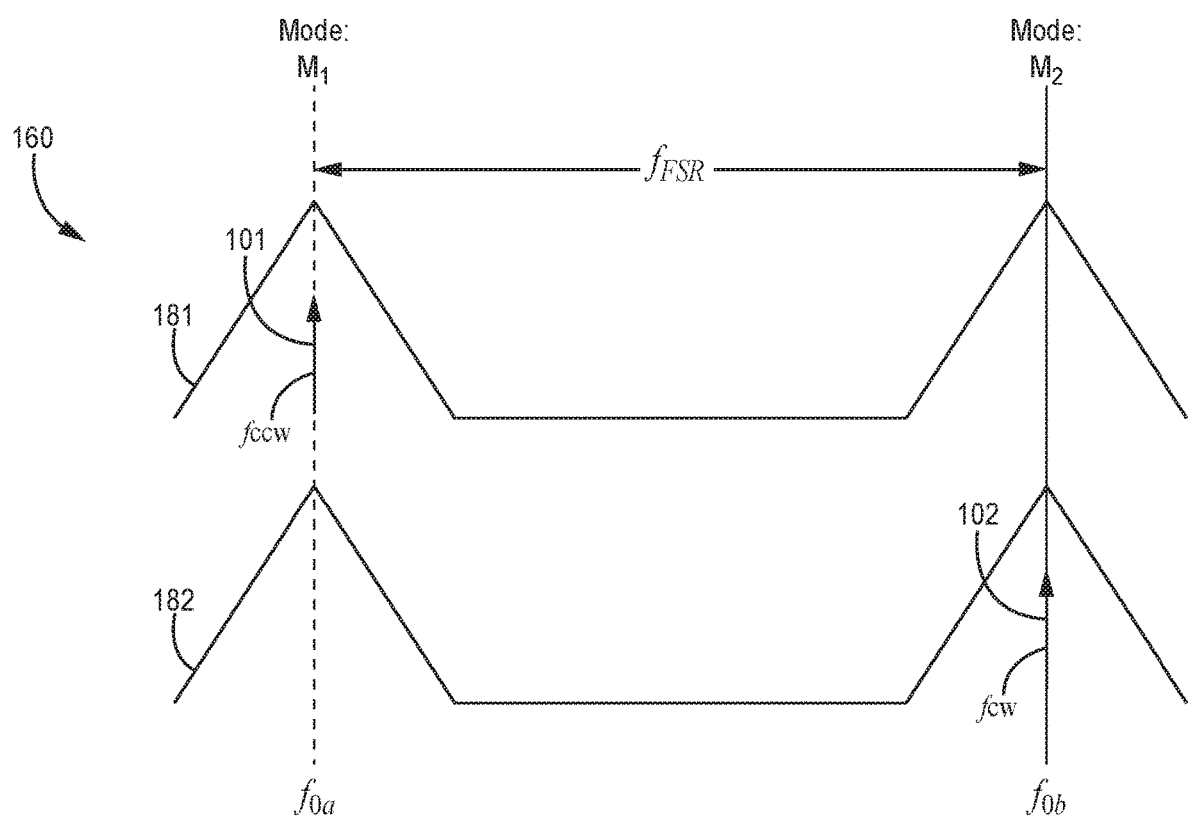
FIG. 1B illustrates a diagram of one embodiment of resonant modes of a resonator of a resonating fiber optic gyroscope.

FIG. 1B illustrates a diagram of one embodiment of resonant modes of a resonator of a resonating fiber optic gyroscope. Operation of the first laser source 110 and the second laser source 112 to produce the first optical signal 101 and the second optical signal 102 at adjacent resonant modes (shown at $M_1$ and $M_2$) is further illustrated by the intensity versus frequency graphs shown in FIG. 1B. As shown generally at 160, the first optical signal 101 is driven to a frequency fccw that is equal to the frequency foa corresponding to a first resonant mode $M_1$. As shown generally at 162, the second optical signal 102 is driven to a frequency fcw equal to the frequency fob corresponding to a second resonant mode $M_2$. The frequency difference between the peak resonant intensity at mode $M_1$ and the peak resonant intensity at mode $M_2$ is equal to the $f_{FSR}$. For the examples illustrated in this disclosure, first laser source 110 and the second laser source 112 operate at adjacent resonant modes, respectively frequencies $M_1$ and $M_2$, separated by one $f_{FSR}$. However, it should be appreciated that additional embodiments are conceived where first laser source 110 and the second laser source 112 are operated at respectively at frequencies $M_1$ and $M_2$ separated by other integer multiples of $f_{FSR}$.

As mentioned above, the frequency fccw of the first optical signal 101 is locked to a resonance frequency foa by the first resonance switching servo loop 130 while the frequency fcw of the second optical signal 102 is locked to a resonance frequency fob by the second resonance switching servo loop 132. In one embodiment, this is accomplished by operating the first resonance switching servo loop 130 and the second resonance switching servo loop 132 as frequency locked loops. More specifically, the first optical signal 101 is frequency or phase modulated to interrogate the resonator. A portion of the first optical signal 101 is coupled out of the resonator 120 by at least one second optical coupler 123 and delivered to a first photodetector 127, which measures the optical intensity of the coupled portion of the first optical signal 101. From this measurement, the first photodetector 127 produces a first resonance tracking signal 126, which is an electrical signal that varies as a function of the measured optical intensity. When the average optical frequency of the first optical signal 101 is on resonance, the output of the first photodetector 127 will not have a frequency component at the modulation frequency. To first order, the output of the first photodetector 127 at the modulation frequency will be proportional to small average optical frequency deviations from the resonance frequency. Deviation from resonance frequency foa produces a tracking error at the modulation frequency reflected in the first resonance tracking signal 126. The first resonance switching servo loop 130 is configured to receive the first resonance tracking signal 126 at the modulation frequency and to output a first control signal 140 to the first laser source 110 that adjusts the frequency fccw of the first optical signal 101 to drive the tracking error at the modulation frequency to zero (i.e., the first control signal 140 drives the first optical signal 101 to the desired resonance frequency). In the same way, a portion of the second optical signal 102 is coupled out of the resonator 120 by the at least one second optical coupler 123 and delivered to a second photodetector 124, which measures the optical intensity of the coupled portion of the second optical signal 102. From this measurement, the second photodetector 124 produces a second resonance tracking signal 125, which is an electrical signal that varies as a function of the measured optical intensity. When the average optical frequency of the second optical signal 102 is on resonance the output of the second photodetector 124 will not have a frequency component at the modulation frequency. To first order, the output of the second photodetector 124 at the modulation frequency will be proportional to small average optical frequency deviations from the resonance frequency. Deviation from resonance frequency fob produces a tracking error at the modulation frequency reflected in the second resonance tracking signal 125. The second resonance switching servo loop 132 is configured to receive the second resonance tracking signal 125 and to output a second control signal 142 to laser source 112 that adjusts the frequency fcw of the second optical signal 102 to drive the tracking error at the modulation frequency to zero (i.e., control signal 142 drives second optical signal 102 to the desired resonance frequency). The phase, or frequency, modulation applied within RFOG 100 prior to the resonator 120 to facilitate detection of when each of the optical signals are at a resonance mode is described by U.S. Pat. No. 7,362,443 which is incorporated herein by reference in its entirety.

The first resonance switching servo loop 130 and the second resonance switching servo loop 132 are referred to as "resonance switching" because, in some embodiments, the respective resonator modes used for the first optical signal 101 and the second optical signal 102 are periodically swapped. That is, after operating for a fixed period of time with the first optical signal 101 at resonance frequency foa (Mode $M_1$) and the second optical signal 102 at resonance frequency fob (Mode $M_2$), the first resonance switching servo loop 130 and the second resonance switching loop 132 will switch the first optical signal 101 from resonance frequency foa to resonance frequency fob while simultaneously switching the second optical signal 102 from resonance frequency fob to resonance frequency foa. Alternating each optical signal between different resonance modes in this manner further facilities mitigation of interference type backscatter error, errors caused by temperature induced variations in the FSR, and lineshape asymmetry gradient errors caused by double optical backscatter or back-reflections, as further described below.

FIG. 1B, discussed above, illustrates adjacent resonance modes for the first optical signal 101 and the second optical signal 102 under the condition that the resonator 120 is not experiencing any rotation (i.e., has an angular rotation rate of zero). The frequency shift $f_\Omega$ between CW and CCW resonances in the resonator due to rotation is also referred to herein interchangeably as the "rotation rate frequency shift". When the resonator 120 is not undergoing rotation, the various resonance modes for second optical signal 102 traveling in the CW direction (shown by curve 182) will align in frequency with the various resonance modes for the first optical signal 101 traveling in the CCW direction (shown by curve 181), as is indicated in FIG. 1B. However, when resonator 120 is experiencing rotation with respect to its sensing axis, the respective path lengths traveled by the second optical signal 102 and the first optical signal respectively travelling in the CW and CCW directions will no longer be equal, exhibiting a phenomenon known as the Sagnac effect. For example, if resonator begins rotating in the CCW direction, the distance that the first optical signal 101 must travel to complete one trip around the resonator 120 increases in length, while the distance that the second optical signal 102 must travel to complete one trip around the resonator 120 decreases in length. For a given frequency of light, the number of wavelengths that fit within the CW and CCW paths become dissimilar, and therefore the resonance modes associated with each direction will no longer align with each other.

Figure 1C:
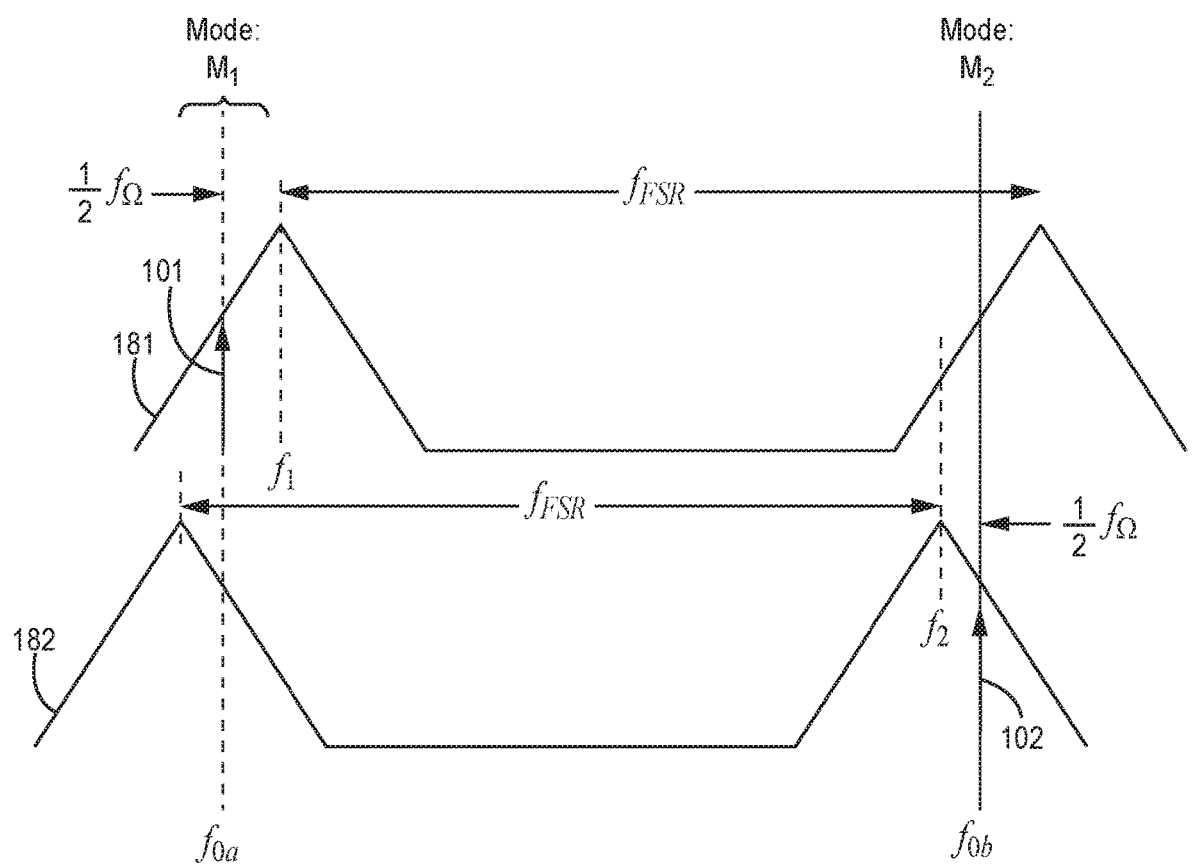
FIG. 1C illustrates a diagram of another embodiment of resonant modes of a resonator of a resonating fiber optic gyroscope.

FIG. 1C illustrates a diagram of another embodiment of resonant modes of a resonator of a resonating fiber optic gyroscope. The resonant frequency for the CCW direction 181 which the first optical signal 101 was locked to shifts from $f_{oa}$ (the non-rotation resonant frequency for resonance mode $M_1$) to $f_1$, a shift of ½ $f_\Omega$ caused by rotation. The resonant frequency for the CW direction 182 which the second optical signal 102 was locked to shifts from $f_{ob}$ (the non-rotation resonant frequency for resonance mode $M_2$) to $f_2$, a shift of −½ $f_\Omega$ caused by rotation. For FIG. 1C, the frequencies of the first optical signal 101 and the second optical signal 102 have remained unchanged from the zero rotational resonance frequencies $f_{oa}$ and $f_{ob}$. In this case, a resonance tracking error signal is present until the first and second resonance switching loops 130 and 132 control the laser frequencies to the new resonance frequencies to $f_1$ and $f_2$.

Figure 2:
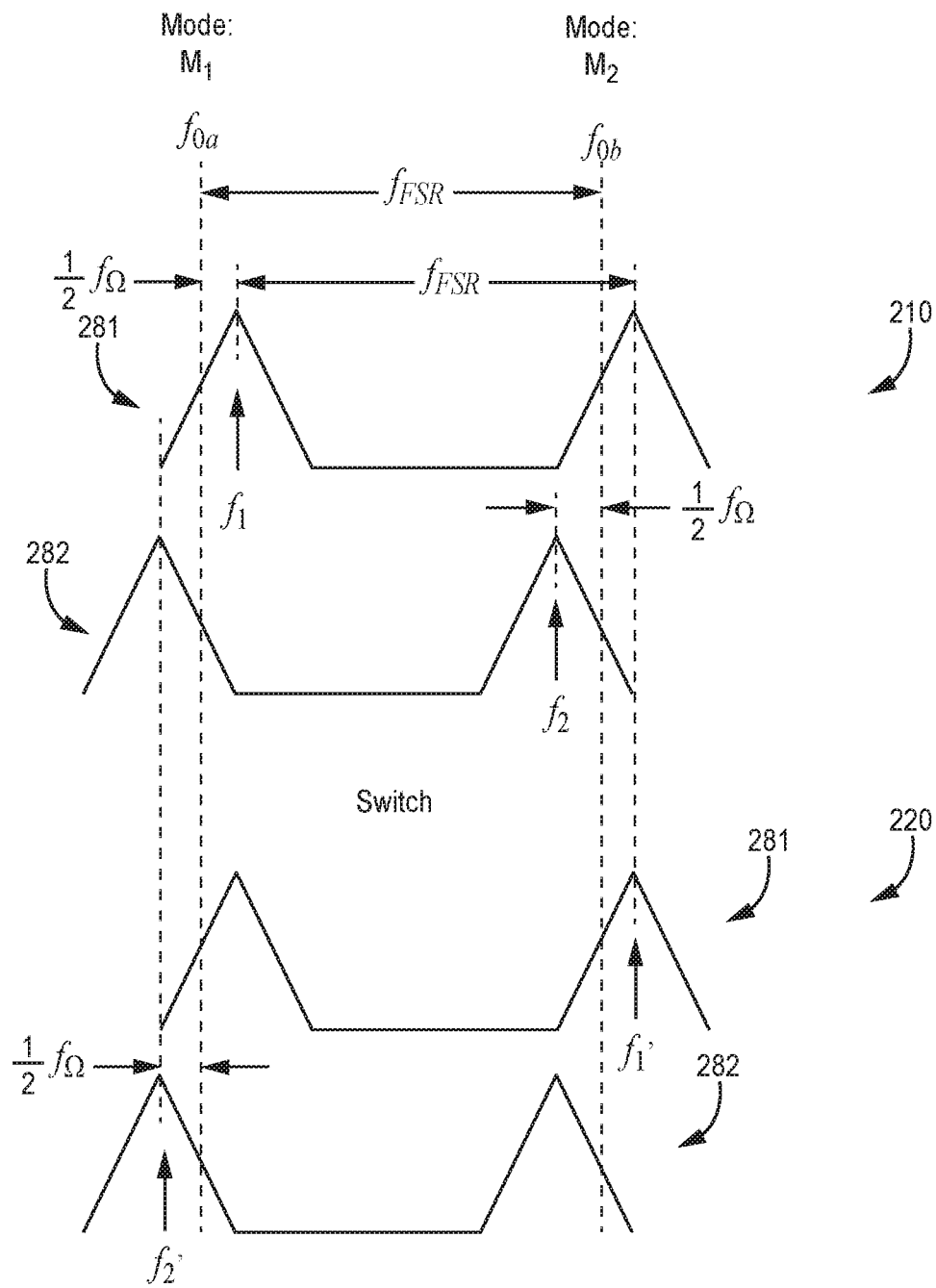
FIG. 2 is a diagram illustrating one embodiment of resonant mode switching for a resonator fiber optic gyroscope.

FIG. 2 is a diagram illustrating one embodiment of resonance mode switching for a resonator fiber optic gyroscope. Operation of RFOG 100 during a first switching state is shown generally at 210 where the first optical signal 101 is locked to resonant mode $M_1$ and the second optical signal 102 is locked to the adjacent resonant mode $M_2$. Due to rotation of the resonator 120, in the path traveled by the first optical signal 101 the frequency of resonance mode $M_1$ has shifted from the initial resonant frequency foa to resonant frequency $f_1$ (as shown generally at 281). This shift is directly a function of the rate of rotation and equal to ½ $f_\Omega$. In the path traveled by the second optical signal 102, the frequency of resonance mode $M_2$ has shifted in the opposite direction from the initial resonant frequency fob to a new resonant frequency $f_2$ (as shown generally at 282). This shift is also directly a function of the rate of rotation and equal to ½ $f_\Omega$. In the manner described above, the first and second resonance switching servo loops 130 and 132 will adjust and drive the first optical signal 101 and the second optical signal 102 to maintain them at these new respective resonant frequencies $f_1$ and $f_2$ under a non-zero rotation rate. The shifts in the resonance frequencies and their relationship to the rotation rate of the resonator 120 can be expressed as:

$$f_1 = f_{0a} + \frac{1}{2} f_\Omega$$

$$f_2 = f_{0a} + f_{FSR} - \frac{1}{2} f_\Omega$$

$$\Delta f = f_1 - f_2 = -f_{FSR} + f_\Omega$$

Thus, $\Delta f$ is the difference between the CCW and CW resonance frequencies of the resonator 120 which contains the shift due to the rotation rate and the FSR.

It is evident that $\Delta f$ includes a measurement of the rotation rate $f_\Omega$, but also includes a component of the FSR. The total length of the resonator 120 will expand and contract with temperature and for that reason FSR is a variable element that will change with the temperature. For that reason, the $f_{FSR}$ cannot be readily accounted for to obtain $f_\Omega$ from $\Delta f$. However, switching operation of RFOG 100 to the second switching state that swaps resonant modes between the first optical signal 101 and the second optical signal 102 leads to the development of a set of two independent linear equations with two unknowns, which permits solving for both $f_{FSR}$ and $f_\Omega$.

Operation of RFOG 100 in the second switching state is shown generally at 220 where the first optical signal 101 is now locked to resonant mode $M_2$ and the second optical signal 102 is locked to the adjacent resonant mode $M_1$ and the shifts in resonant frequencies in the CCW and CW directions due to rotation are shown respectively at 283 and 284 In this state, the shifts in the resonance frequencies and their relationship to the rotation rate of the resonator 120 can be expressed as:

$$f_1' = f_{0a} + f_{FSR} + \frac{1}{2} f_\Omega$$

$$f_2' = f_{0a} - \frac{1}{2} f_\Omega$$

$$\Delta f' = f_1' - f_2' = f_{FSR} + f_\Omega$$

By adding the equations for $\Delta f$ and $\Delta f'$:

$$\Delta f_+ = \Delta f' + \Delta f = 2f_\Omega$$

which is an expression for the rotation rate frequency shift $f_\Omega$ without the influence of a $f_{FSR}$ component. Similarly, by subtracting the equations for $\Delta f$ and $\Delta f'$:

$$\Delta f_\Delta = \Delta f' - \Delta f = 2f_{FSR}$$

which provides an expression to calculate the $f_{FSR}$ without the influence a rotation rate frequency shift value $f_\Omega$ component.

Advantageously, calculation of $\Delta f_+$ in the manner describe above by switching the first optical signal 101 and the second optical signal 102 between resonant modes $M_1$ and $M_2$ also serves to produce a value of $2f_\Omega$ from which the effects of lineshape asymmetry gradient error have been canceled. That is, when frequency shifts due to lineshape asymmetry are included in the above analysis, the expressions for operation in the first switching state become:

$$f_1 = f_{0a} + \delta f_a + \frac{1}{2} f_\Omega$$

$$f_2 = f_{0a} + f_{FSR} + \delta f_b - \frac{1}{2} f_\Omega$$

$$\Delta f = f_1 - f_2 = (\delta f_a - \delta f_b) - f_{FSR} + f_\Omega$$

where $\delta f_a$ is the frequency shift in the first optical signal 101 due to lineshape asymmetry when the first optical signal 101 is locked to resonant mode $M_1$, and $\delta f_b$ is the frequency shift in the second optical signal 102 due to lineshape asymmetry when the second optical signal 102 is locked to resonant mode $M_2$.

The expressions for operation in the second switching state become:

$$f_1' = f_{0a} + f_{FSR} + \delta f_b + \frac{1}{2} f_\Omega$$

$$f_2' = f_{0a} + \delta f_a - \frac{1}{2} f_\Omega$$

$$\Delta f' = f_1' - f_2' = -(\delta f_a - \delta f_b) + f_{FSR} + f_\Omega$$

So that once again:

$$\Delta f_+ = \Delta f' + \Delta f = 2f_\Omega$$

which is an expression for the rotation rate frequency shift value $f_\Omega$ without the influence of either a $f_{FSR}$ or lineshape asymmetry component.

To facilitate the above calculations, the resonance switching servo loop 130 and resonance switching servo loop 132 repeatedly cycle between the first switching state and the second switching state so that during the first half of each cycle laser source 110 is locked to resonance mode $M_1$ and laser source 112 is locked to resonance mode $M_2$, and during the second half of each cycle laser source 110 is locked to resonance mode $M_2$ and laser source 112 is locked to resonance mode $M_1$. Consistent with the above, resonance switching servo loop 130 outputs the first control signal 140 equal to $f_1$ for the first half of each cycle, and equal to $f_1$ for the second half of each cycle. Likewise, resonance switching servo loop 132 outputs a control signal 142 equal to $f_2$ for the first half of each cycle, and equal to $f_2$ for the second half of each cycle. As shown in FIG. 1A, the first control signal 140 and the second control signal 142 are also each provided to feed-forward rate processor 135, so that feed-forward rate processor 135 can calculate Δf$_+$ and from that output rotation rate measurements Q from rotation rate frequency shift value f$_Ω$. In some embodiments, feed-forward rate processor 135 may further utilize the values provided by the first control signal 140 and the second control signal 142 to calculate Δf$_Δ$ and from that output FSR measurements f$_{FSR}$.

Because FSR changes with temperature, feed-forward rate processor 135 needs to continuously re-calculate Δf$_+$ quickly enough to accommodate changes in FSR. Otherwise, if Δf$_+$ is calculated from old data that does not represent current conditions, some fraction of FSR will enter into, and therefore corrupt, the rotation rate output. Resonant frequency switching needs to occur at a sufficiently high frequency so that FSR error is canceled out from the rotation rate calculations. However, switching too frequently also has drawbacks. During the finite period of time in which the servos 130 and 132 are actually performing the switch between resonant modes M$_1$ and M$_2$, the frequency data carried by the first control signal 140 and the second control signal 142 becomes corrupted and unusable. Increasing the resonance switching frequency therefore also increases the fraction of corrupted and unusable data sent to feed-forward rate processor 135 per each resonance switching cycle, decreasing the usable fraction of data that feed-forward rate processor 135 has to work with per switching cycle. Further, a completely independent consideration is the rate at which RFOG 100 needs to output fresh rotation rate measurement samples to satisfy system design criteria. The measurement sample output rate will likely be many orders of magnitude faster than the optimal resonance switching frequency. For example, where it may be optimal based on expected temperature dynamics for the switching state to be switched once per second (i.e., 1 Hz), for navigation applications, RFOG 100 may be called on to provide rotation rate measurement samples at a frequency of 1 kHz or greater.

Figure 3:
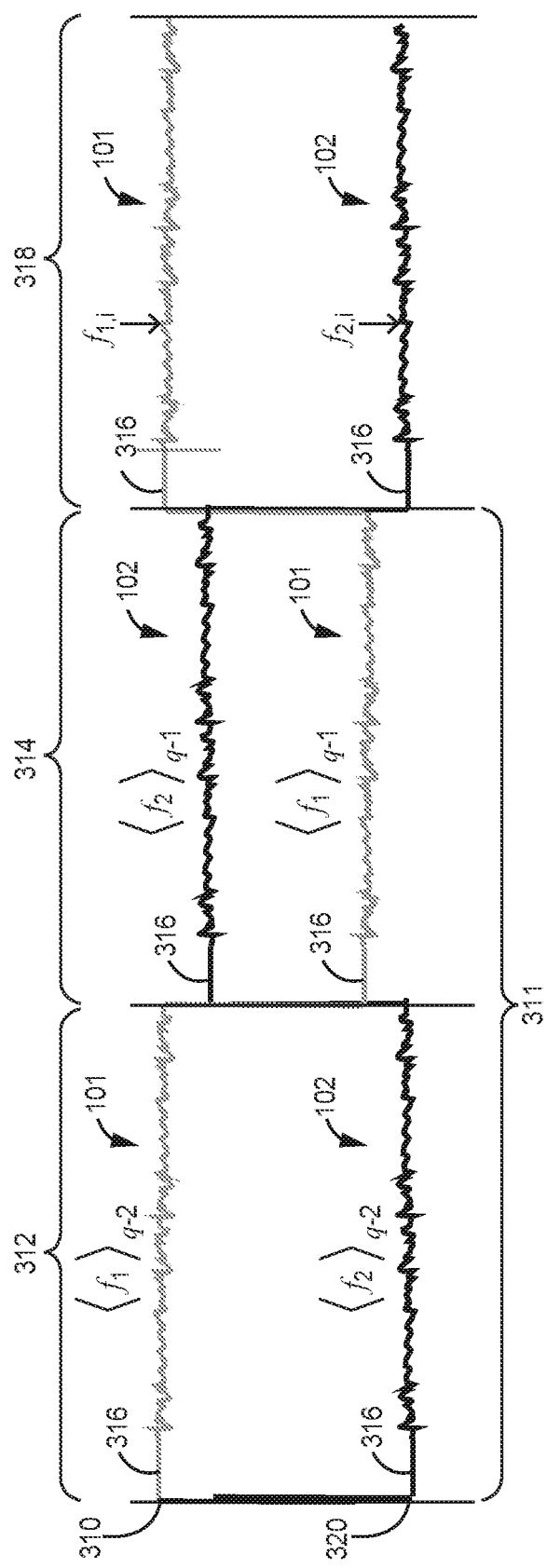
FIG. 3 is a diagram illustrating one embodiment of feed-forward rotation rate processing of a resonator fiber optic gyroscope.

In order to provide for a slower resonance switching frequency that does not limit RFOG 100's sensing bandwidth, feed-forward rate processor 135 also employs the feed forward mechanism. FIG. 3 is a diagram illustrating one embodiment of feed-forward rotation rate processing of a resonator fiber optic gyroscope. Curve 310 is a plot of frequency f$_1$ of the first optical signal 101 verses time while it is alternatively locked to the two CCW resonances, while curve 320 is a plot of frequency f$_2$ of the second optical signal 102 verses time while it is alternatively locked to the two CW resonances. During each steady state time interval, 312, 314, and 318 (except during transient period 316) f$_1$ and f$_2$ are assumed to be locked to a resonance frequency of the resonator 120, so f$_1$ and f$_2$ are indicative of both the frequencies of the first optical signal 101 and the second optical signal 102, and the measured CCW and CW resonance frequencies of the resonator 120, respectively. In one embodiment, feed-forward rate processor 135 includes one or more digital signal processing units (or digital processing circuits) that calculate a first resonance frequency average <f$_1$> based on the output of first optical signal 101 from the resonator 120, and a second resonance frequency average <f$_2$> based on the output of the second optical signal 102 from the resonator 120, for each half of a switching cycle. Using the difference between resonance frequency averages <f$_1$>, <f$_2$>, obtained from both a first and second half of a switching cycle, an average <Δf$_Δ$> may be calculated that is equal to <2f$_{FSR}$>, which is proportional to the average FSR of the resonator 120 over the period of the full switching cycle 311. Because, FSR is expected to change with temperature, but not at a rate comparable to the rate at which RFOG 100 outputs rotation rate measurement samples, this <2f$_{FSR}$> measured from the immediately prior switching cycle 311 is used by feed-forward rate processor 135 to cancel f$_{FSR}$ from current f$_1$ and f$_2$ resonant frequency measurements. That is, the <2f$_{FSR}$> calculated for a past resonance switching cycle is fed-forward to and applied to the high frequency present frequency measurements to compensate for FSR during the current switching cycle, until a new <2f$_{FSR}$> is calculated for the current switching cycle. This new <2f$_{FSR}$> will then be fed-forward by feed-forward rate processor 135 for use to compensate for FSR for the next switching cycle. At any point during any half-cycle (that is, regardless of the current switching state) a corrected current rotation rate frequency shift value f$_Ω$ measurement may be calculated by feed-forward rate processor 135 from:

$$\Delta f_c = f_1 - f_2 + \frac{1}{2} <\Delta f_\Delta> = -f_\Omega$$

where f$_1$ and f$_2$ are current resonant frequency measurements (since the frequencies of the second optical signal 102 and the first optical signal 101 are respectively locked to CW and CCW resonance frequencies of the resonator 120) provided from the outputs of the first resonance switching servo loop 130 and the second resonance switching servo loop 132, and <Δf$_Δ$> is the fed-forward f$_{FSR}$ error correction (which may also include a lineshape asymmetry gradient correction as explained above) calculated from a past switching cycle. However, the rotation rate frequency shift value is not temperature compensated as discussed elsewhere herein.

As shown generally at 311, a previous full cycle of resonant frequency measurements comprises a first ½ cycle where the first optical signal 101 is locked to resonant mode M$_1$ and the second optical signal 102 is locked to resonant mode M$_2$ (shown at 312) and second ½ cycle where the first optical signal 101 is locked to resonant mode M$_2$ and the second optical signal 102 is locked to resonant mode M$_1$ (shown at 314). In FIG. 3, measurement samples resonant frequency switching states are indicated by the index reference "q" while the index "i" indicates resonant frequency f$_1$, f$_2$ measurement samples produced by the first and second resonance switching servo loops 130 and 132. Also, in FIG. 3, the higher frequency is represented by the lower of the two traces, consistent with the resonance frequency of mode M$_2$ being higher than the resonance frequency of mode M$_1$. Referring to FIG. 3 at 314, the average <f$_1$>$_{q-1}$ is the average of the measured resonant frequency f$_1$ values captured while the first optical signal 101 was locked to resonant mode M$_2$ during the full cycle 311 of resonant frequency measurements. The average <f$_2$>$_{q-1}$ is the average of the measured resonant frequency f$_2$ values captured while the second optical signal 102 was locked to resonant mode M$_1$ during the full cycle 311 of resonant frequency measurements. Referring to FIG. 3 at 312, the average <f$_1$>$_{q-2}$ is the average of the resonant frequency f$_1$ values captured while optical beam 101 was locked to resonant mode M$_1$ during the full cycle 311 of resonant frequency measurements. The average <f$_2$>$_{q-2}$ is the average of the resonant frequency f$_2$ values captured while optical beam 102 was locked to resonant mode M$_2$ during the full cycle 311 of resonant frequency measurements. It should be noted that at 316, each of the resonant frequencies are flat-lined immediately after switching between modes M$_1$ and M$_2$ is initiated. During these transient periods, the f$_1$ values and f$_2$ values are blanked out and unused so as not to affect the calculation of the <f$_1$> and $<f_2>$ averages. The two half-cycles 312 and 314 together form a full resonance switching cycle 311 from which a $<\Delta f_A>$ may be calculated as follows. From the first half cycle at 312:

$$<\Delta f>_{q-2} = <f_1>_{q-2} - <f_2>_{q-2}$$

and from the second half cycle at 314:

$$<\Delta f>_{q-1} = <f_1>_{q-1} - <f_2>_{q-1}$$

Subtracting the first from the second provides:

$$<\Delta f_A>_{q-1} = <\Delta f>_{q-1} - <\Delta f>_{q-2} = <2f_{FSR}>$$

This current estimate of the FSR is then fed-forward to apply to the current resonant frequency values $f_{1,j}$ and $f_{2,j}$ (shown at 318) from the first resonance switching servo loop 130 and the second resonance switching servo loop 132 using:

$$\Delta f_i = f_{1,i} - f_{2,i} + \frac{1}{2} <\Delta f_\Delta>_{q-1} = f_{\Omega,i}$$

resulting in a current measurement of rotation rate frequency shift measurement $f_{\Omega,i}$ which is compensated for FSR error and lineshape asymmetry gradient error, and which may be calculated at a sample frequency many order of magnitudes higher than the resonance switching frequency used to estimate FSR from $<\Delta f_A>$.

An RFOG configured to generate both rotation rate and FSR, such as the one illustrated above, may be used to more accurately determine a temperature dependent rotation rate frequency shift by accounting for changes in RFOG bias and/or scale factor due to temperature. The temperature dependent, but corrected, rotation rate, $\Omega_{TD}$ is based on a model of an RFOG may be described as:

Corrected rotation rate=$\Omega_{TD}$=(SF(T)*($f_\Omega$))−Bias(T), where $f_\Omega$ is the measured, but not corrected, frequency shift due to rotation rate SF(T) is a temperature dependent scale factor, and Bias(T) is a temperature dependent bias.

In the above equation, T is the actual nearly-instantaneous, spatially averaged temperature of the optical signal path in the resonator 120, which is best represented by the free spectral range, $f_{FSR}$, which may be read out of the gyro signal processing. Thus, in the corrected rotation rate equation, the measured value of $f_{FSR}$ may be substituted into the equation for T via the equation:

$$f_{FSR} a_0 + a_1 T.$$

Wherein $a_0$ is the temperature independent component of the $f_{FSR}$ and $a_1$ is the coefficient of proportionality between $f_{FSR}$ and the spatially averaged temperature of the light path in the resonator 120. Although both bias and scale factor are illustrated as being temperature dependent, alternatively the temperature dependent rotation rate frequency model may include only one of temperature dependent bias and temperature dependent scale factor; the other parameter would be fixed with respect to temperature.

The temperature dependence of scale factor and/or bias may be characterized and stored in the RFOG 100 using model(s). In some embodiments, the model(s) may be stored in the processing system 119.

Because FSR is inversely proportional to the average temperature of the resonator 120, temperature dependent bias and temperature dependent scale factor can be modelled using FSR in lieu of temperature. Characterization of temperature dependent bias will first be addressed.

Bias temperature dependence is characterized by determining bias versus one or more orders of FSR (e.g. one or more of FSR, $FSR^2$, $FSR^3$, etc.) and/or bias versus one or more orders of a derivative of FSR with respect to time (e.g. one or more of dFSR/dt, $d^2FSR/dt^2$, $d^3FSR/dt^3$, etc.). The orders of FSR and/or the orders of the derivative of FSR with respect to time may vary based upon RFOG design and/or the desired accuracy of rotation rate. Thus, bias and FSR must be determined with respect to changes in temperature or rates of change of temperature.

Figures 4A, 4B:
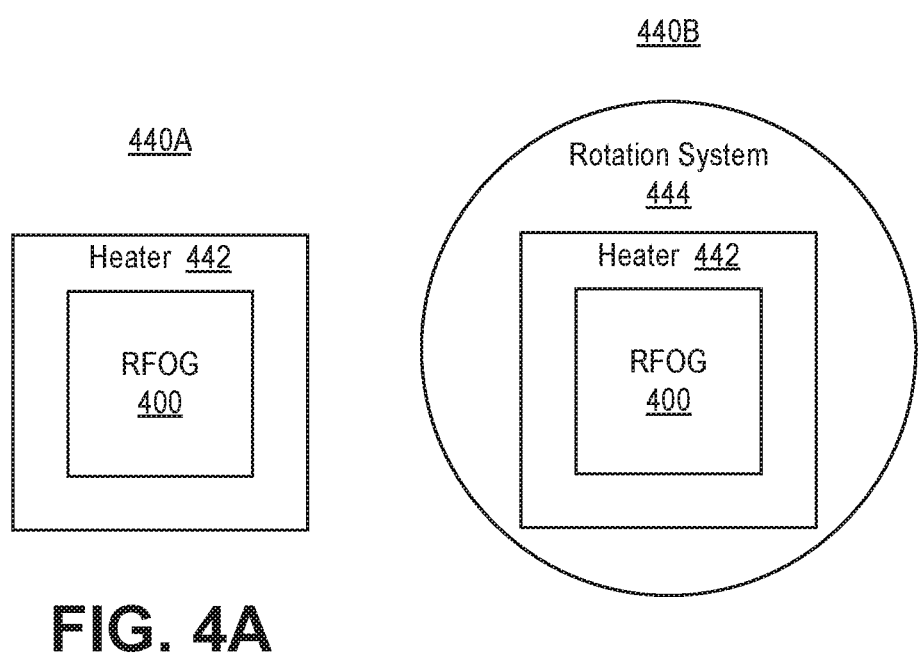
FIG. 4A illustrates a diagram of one embodiment of a measurement system.
FIG. 4B illustrates a diagram of another embodiment of a measurement system.

FIG. 4A illustrates a diagram of one embodiment of a measurement system 440. The measurement system 440A comprises a heater 442 upon or in which the RFOG 400 can be placed. The heater 442 may be a hot plate or an oven. The heater 442 is configured to heat the RFOG 400, and particularly the resonator 120, as described herein to facilitate determination of temperature dependence of bias, and temperature dependence of scale factor.

Determination of rotation rate versus one or more orders of FSR (e.g. one or more of FSR, $FSR^2$, $FSR^3$, etc.) and/or rotation rate versus one or more orders of a derivative of FSR with respect to time (e.g. one or more of dFSR/dt, $d^2FSR/dt^2$, $dFSR/dt^3$, etc.) may be performed as follows. Initially, a first set of measurements of the RFOG's rate of rotation 129 of the resonator 120 around the center axis 128 and FSR are taken over a temperature range. When such measurements are made, the resonator 120 of the RFOG 100 is fixedly positioned around its center axis 128 so that the resonator 120 has a known fixed first rotation rate, e.g. a zero rotation rate. Further, the center axis 128 may be pointed East or West, e.g. to diminish effects from the rotation of the Earth; otherwise a component corresponding to the Earth's rotation would have to be accounted for such measurements. The first set of measurements is stored in processing circuitry, e.g. other processing circuitry external to the RFOG 100.

If a fixed non-zero rate is used, then a rotation system is required. Further, the rotation system is also required to characterize temperature dependent scale factor. FIG. 4B illustrates a diagram of another embodiment of a measurement system 440B. The measurement system 440B comprises a heater 442 upon or in which the RFOG 400 can be placed. The heater 442 may be a hot plate or an oven. The heater 442 is configured to heat the RFOG 100, and particularly the resonator 120, as described herein. The RFOG 400 on or in the heater 442 are placed on a rotation system 444 (e.g. a rotation table) or the RFOG 400 on the rotation system 444 are placed in the heater 442. The measurement system 440B is used to rotate the RFOG 400 around its center axis 128 at fixed and/or variable rate(s) of rotation.

To characterize temperature dependent scale factor, rotation rate needs to be measured versus one or more orders of FSR and/or rotation rate versus one or more orders of a derivative of FSR with respect to time (e.g. one or more of dFSR/dt, $d^2FSR/dt^2$, $d^3FSR/dt^3$, etc.) in a manner described above but for one or more rotation rates (in the measurement range of the RFOG 400) that are different then the rotation rate used to characterize temperature dependent bias.

The first set of measurements is made over and/or within the expected operating range of a corresponding order of temperature (that is the same order as the order of FSR). For example, the first set of measurements are made over a corresponding expected temperature operating range (e.g. −55° C. to 125° C. or −40° C. to 85° C.) of the RFOG 100. Optionally, additionally or alternatively, measurements of a rotation rate versus the corresponding order FSR measurements and/or measurements of a rotation rate versus the order of derivative of FSR with respect to time can be made in equal increments or steps.

The first set of measurements may include measurements of FSR made by varying temperature at fixed or varying rates with respect to time. For example, for the first order derivative of FSR with respect to time, RFOG temperature can be ramped up from a first temperature to a second temperature at a fixed rate, and then ramped down at the same or different fixed rate from the second temperature to the first temperature. As a result, positive and negative temperature slopes with respect to time are measured. Measurements can be made when varying a rate of change in temperature with respect to time to characterize higher order derivatives of FSR with respect to time.

Subsequently, a second set of measurements of the RFOG's rate of rotation 129 of the resonator 120 around the center axis 128 and FSR are taken over a temperature range (which at least includes the temperature range used for the first set of measurements) at a known, fixed second rotation rate that is a non-zero rate of rotation and is different than the known, fixed second rotation rate. Again, the center axis 128 may be pointed East or West, e.g. to diminish effects from the rotation of the Earth. To account for order(s) of FSR with respect to time, and order(s) of derivatives of FSR with respect to time, the second set of measurements is taken by changing temperature at a fixed rate with respect to time and/or by varying a rate of change of temperature with respect to time—as discussed above. Optionally, at least one additional bias component may be characterized which comprises an order of a derivative of a thermal spatial gradient across the resonator 120 with respect to time.

The thermal spatial gradient may be measured with thermal sensors, e.g. thermocouples and/or thermistors placed at different locations of the resonator 120. For example, returning to FIG. 1A, a first set of at least one thermal sensor 131 may be placed on or by the resonator 120 diametrically opposite a second set of at least one thermal sensor 133 placed on or by the resonator 120. Alternatively, for example, the thermal spatial gradient, $\Delta T$, may be measured between the inner and outer diameters of the optical fiber coil that forms the resonator 120. To do so, the first set of one or more thermal sensors may be placed on or by optical fiber(s) forming an inner diameter of the optical fiber coil and the second set of one or more thermal sensors may be placed (opposite the first set of at least one thermal sensor 131) on or by optical fiber(s) forming an outer diameter of the optical fiber coil. The sets of thermal sensors may be located elsewhere to characterize the foregoing or other thermal spatial gradients. This bias component (comprising order(s) of derivative of thermal spatial gradient data with respect to time) may be stored in the first set of measurements, e.g. as described elsewhere herein.

The thermal spatial gradient can be induced in the resonator 120 by only activating heating elements in the heater 442 closer to one side of the resonator nearer to the first set of at least one thermal sensor 131 then the second set of at least one thermal sensor 133 (or vice versa). Alternatively, the thermal spatial gradient can be induced in the resonator 120 by generating more heat from heating elements in the heater 442 resonator nearer to the first set of at least one thermal sensor 131 then the heating elements nearer to the second set of at least one thermal sensor 133 (or vice versa).

Coefficients of equations (or mathematical models) of temperature dependent bias and/or scale factor may be determined for each RFOG using corresponding measurement data. For example, each of temperature dependent bias and temperature dependent scale factor can be modelled using a polynomial function having at least one term, where each term comprises: (a) at least one constant, and at least one of: (a) a power of FSR (e.g. one of FSR, $FSR^2$, $FSR^3$, etc.) multiplied by a corresponding constant; and (b) an order of a derivative of FSR with respect to time (e.g. one of dFSR/dt, $d^2FSR/dt^2$, $d^3FSR/dt^3$, etc.) multiplied by a corresponding constant.

To solve for the constants (e.g. $k_1$, $k_2$, $k_3$, $k_4$, and $k_5$) in the polynomial equation modeling the temperature dependent bias and/or temperature dependent scale factor, the first measurement set must include a number of measurements taken equal to or greater than the number of constants to be solved (e.g. 5: $k_1$ through $k_5$).

Thus, for example, if modelled, temperature dependent bias may be modelled by:

$$\text{Bias}(FSR) = k_1 + k_2 * FSR + k_3 * FSR^2 + k_4 * dFSR/dt + k_5 * d(\Delta T)/dt$$

Note, the foregoing model is exemplary and other models can be used, e.g. with different orders of FSR, different orders of derivative of FSR with respect to time, with order(s) of thermal spatial gradient, with different orders of thermal spatial gradient with respect to time, and/or without any term that is a function of thermal spatial gradient term.

Any coefficient of a constant term (e.g. $k_1$) and any coefficient multiplied by an order of FSR (e.g. $k_2$ and $k_3$) are determined using fitting. Fitting described herein may be, e.g. least square fitting. For the combination of any constant term and any term(s) comprising a constant multiplied by an order of FSR, the bias is fitted with respect to measured FSR by changing the temperature (at a predetermined fixed rotation rate) in the first set of measurements. The number of determinations of bias with respect to FSR by varying temperature in the first measurement set must be equal or greater than the number of constants to be fitted or determined. For instance, if there are three constants, bias must be measured at a minimum number of three different values of the FSR. In practice, in the presence of noise, many more points are used to get more confidence in the determination of the coefficients. In the case determining $k_1$, $k_2$, and $k_3$ in the above equation, a linear ramp of the temperature with continuous monitoring of the indicated rate (while not rotating) gives hundreds or thousands of independent measurements to base the coefficient determination upon. In this example, to isolate $k_3$, a wide temperature range may be used, so that departures from a linear dependence may be observed.

Any coefficient of multiplied by an order of a derivative of FSR with respect to time (e.g. $k_4$) is determined using fitting. For the terms comprising a coefficient multiplied by an order of a derivative of FSR with respect to time, the bias is fitted with respect to the measured rate of change of the FSR with respect to time due to the corresponding derivative of temperature with respect to time (at a predetermined fixed rotation rate) in the first set of measurements. Coefficients of orders of thermal spatial gradient and orders of derivative of thermal spatial gradient can be determined in an analogous manner.

Further, temperature dependent scale factor may be modelled in analogously. All or a portion of the RFOG 100 (at least the resonator 120) is placed on the rotation system 444. Temperature is varied over the expected operating temperature range of the RFOG 100. At each temperature increment, rotation rate is measured for different known rotation rates within an expected operating rotation rate range of the RFOG, e.g. +100 degrees/second; the rotation system 444 rotates the resonator 120 around its center axis 128 at such known rotation rates.

Temperature dependent scale factor may be modelled using terms comprising a constant term, at least one term each of which comprises a coefficient multiplied by an order of FSR. Additionally, there may be at least one term each of which comprises a coefficient multiplied by an order of derivative of FSR with respect to time, at least one term each of which comprises a coefficient multiplied by an order of a spatial thermal gradient, and/or at least one term each of which comprises a coefficient multiplied by an order of a derivative of a spatial thermal gradient with respect to time. For example, the temperature dependent scale factor may be modelled as:

$$SF(FSR)=k_6+k_7*FSR$$

To solve for the coefficients, bias is subtracted from the measured rotation rate in the second set of measurement data. The bias is determined using a model whose coefficients have been solved in a manner described elsewhere herein. Then the resulting difference data is used to fit the constants in a manner as described elsewhere herein.

Once the coefficients of the models for bias and scale factor, the models for bias and scale factor, including the coefficients, are stored in the corresponding RFOG(s), e.g. in the processing system 119 of each RFOG. During its operation, an RFOG can determine a temperature compensated rotation rate by measuring the temperature dependent rotation rate frequency shift, and applying the model (or equation):

$$\text{Temperature compensated rotation rate}=\Omega_{TD}=(SF(T)*(\Delta f))-\text{Bias}(T),$$

using the corresponding equations for temperature dependent scale factor and temperature dependent bias using FSR determinations (and possibly thermal spatial gradient measurements). Note, the term corrected rotation rate may be used for rotation rates corrected or compensated for varying temperature or other conditions.

Figure 5:
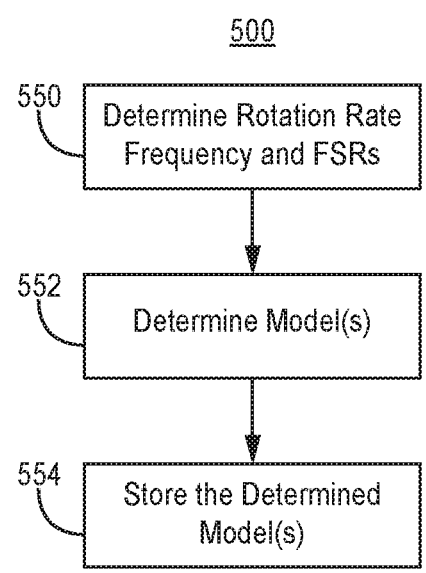
FIG. 5 is a flow diagram illustrating one embodiment of a method for determining a model for correcting time varying changes affecting a resonator of a gyroscope.

FIG. 5 is a flow diagram illustrating one embodiment of a method 500 for determining a model for correcting time varying changes affecting a resonator of a gyroscope. For pedagogical purposes, the method 500 is illustrated with regards to temperature compensation of an RFOG.

To the extent that the embodiment of method 500 shown in FIG. 5 is described herein as being implemented in the systems shown in FIG. 1A, 4A, or 4B, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 550, for one or more sets of predetermined fixed and/or varying rotation rates, determine rotation rate frequencies and FSRs for at least one RFOG over a range of at least one of: temperature, one or more orders of derivatives of temperature with respect to time, thermal spatial gradient of resonator, and one or more orders of derivatives of thermal spatial gradient of resonator with respect to time. Such measurements may be made for example as described above. A predetermined fixed rotation rate may be a zero rotation rate.

In block 552, determine at least one of: a temperature dependent bias model and a temperature dependent scale factor model. The at least one of the temperature dependent bias model and the temperature dependent scale factor model comprise at least a portion of a temperature dependent rotation rate model of an RFOG. Each of the temperature dependent bias model and the temperature dependent scale factor model comprises a term dependent upon the order of the FSR or dependent upon the order of derivative of the FSR with respect to time. Optionally, in block 554, store the determined at least one model in an RFOG which may be an RFOG for which rotation rate and FSR was characterized or another RFOG.

Figure 6:
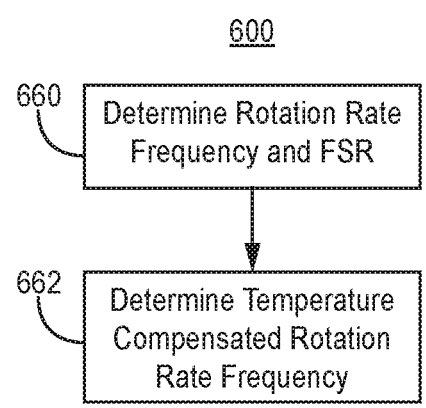
FIG. 6 is a flow diagram illustrating one embodiment of a method for correcting time varying changes affecting a resonator of a gyroscope.

FIG. 6 is a flow diagram illustrating one embodiment of a method 600 for correcting time varying changes affecting a resonator of a gyroscope. For pedagogical purposes, the method 600 is illustrated with regards to temperature compensation of an RFOG.

To the extent that the embodiment of method 600 shown in FIG. 6 is described herein as being implemented in the systems shown in FIG. 1A, 4A, or 4B, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 660, determine free spectral range and rotation rate frequency shift around a center axis of a resonator of an RFOG. In block 662, determine a temperature compensated rotation rate frequency shift, or a temperature compensated rotation rate output, around the center axis of the resonator using the determined free spectral range frequency, the determined rotation rate frequency shift, and at least one of a: temperature dependent bias model and a temperature dependent scale factor model; each of the temperature dependent bias model and the temperature dependent scale factor model comprises a term dependent upon the order of the FSR or dependent upon the order of derivative of the FSR with respect to time.

Example Embodiments

Example 1 includes a method for determining a model for correcting rotation rate output from a gyroscope due to at least one time varying parameter of at least one of a gyroscope and the gyroscope's environment, the method comprising: whilst rotating a resonator of the gyroscope around its center axis at one or more of at least one of: a predetermined fixed rotation rate and a predetermined varying rotation rate, determining the rotation rate frequency shift for a rotation around a center axis of a resonator of the gyroscope and a free spectral range (FSR) of the gyroscope over a range of at least one of: the at least one time varying parameter and one or more orders of derivatives of the with respect to time; determining at least one of: a bias model dependent upon the at least one time varying parameter and a scale factor model dependent upon the at least one varying parameter, where the at least one of the bias model and the scale factor model comprise at least a portion of a rotation rate model of the gyroscope dependent upon the at least one time varying parameter, and where each of the bias model and the scale factor model comprises a term dependent upon the order of the FSR or dependent upon the order of derivative of the FSR with respect to time; and wherein the at least one determined model is configured to correct at least one of bias and scale factor of the gyroscope.

Example 2 includes the method of Example 1, wherein the at least one time varying parameter comprises temperature.

Example 3 includes the method of Example 2, wherein determining rotation rate frequency shift and FSR further comprises determining rotation rate frequency shift and FSR over at least one of: a thermal spatial gradient of the resonator, and one or more orders of derivatives of thermal spatial gradient of the resonator with respect to time.

Example 4 includes the method of Example 2, wherein a model for temperature corrected rotation rate is: (SF(FSR)*$(f_\Omega)$)–Bias(FSR), where $f_\Omega$ is the measured, uncorrected frequency shift due to rotation rate, SF(T) is a temperature dependent scale factor, Bias(T) is a temperature dependent bias, the FSR=$a_0+a_1T$, $a_0$ is the temperature independent component of the FSR, and $a_1$ is the coefficient of proportionality between FSR and a spatially averaged temperature of a path of an optical signal in the resonator.

Example 5 includes the method of Example 1, wherein determining the at least one of the bias model and the scale factor model comprises determining at least one coefficient for at least one of the models; wherein if the bias model is determined, then determining the rotation rate frequency shift and the FSR at a first known, fixed rotation rate; and wherein if the scale factor model is determined, then determining the rotation rate frequency shift and the FSR at least at a second known, fixed, non-zero rotation rate that is different than the first known, fixed rotation rate.

Example 6 includes the method of Example 1, further comprising storing the determined at least one model in the gyroscope.

Example 7 includes the method of Example 2, wherein a temperature dependent bias is modelled by $k_1+k_2*FSR+k_3*FSR^2+k_4*dFSR/dt+k_5*d(\Delta T)/dt$; wherein $k_1$, $k_2$, $k_3$, $k_4$, and $k_5$ are coefficients; wherein dFSR/dt is the first derivative of FSR with respect to time; wherein $d(\Delta T)/dt$ is the first derivative of a thermal spatial gradient across the resonator; wherein the temperature dependent scale factor is modelled by $k_6+k_7*FSR$; and wherein $k_6$ and $k_7$ are coefficients.

Example 8 includes the method of Example 1, wherein when determining rotation rate frequency shift and a free spectral range, the RFOG is at least one of: placed in a heater and on a rotation system.

Example 9 includes a system, comprising: processing circuitry, configured to correct rotation rate output from a gyroscope due to at least one time varying parameter of at least one of a gyroscope and the gyroscope's environment, by: determining free spectral range (FSR) and rotation rate frequency shift for a rotation around a center axis of a resonator of a resonant fiber optic gyroscope (RFOG); determining a corrected rotation rate frequency shift for a rotation around the center axis of the resonator of a resonant fiber optic gyroscope (RFOG) using the determined free spectral range frequency, the determined rotation rate frequency shift, and at least one of a: bias model dependent upon the at least one time varying parameter and a scale factor model dependent upon the at least one time varying parameter.

Example 10 includes the system of Example 9, wherein the at least one time varying parameter comprises temperature.

Example 11 includes the system of Example 10, wherein a model for temperature corrected rotation rate is: (SF(FSR)*$(f_\Omega)$)–Bias(FSR), where $f_\Omega$ is the measured, uncorrected frequency shift due to rotation rate, SF(T) is a temperature dependent scale factor, Bias(T) is a temperature dependent bias, the FSR=$a_0+a_1T$, $a_0$ is the temperature independent component of the FSR, and $a_1$ is the coefficient of proportionality between FSR and a spatially averaged temperature of a path of an optical signal in the resonator.

Example 12 includes the system of Example 9, wherein determining the at least one of the bias model and the scale factor model comprises determining at least one coefficient for at least one of the models; wherein if the bias model is determined, then determining the rotation rate frequency shift and the FSR at a first known, fixed rotation rate; and wherein if the scale factor model is determined, then determining the rotation rate frequency shift and the FSR at least at a second known, fixed, non-zero rotation rate that is different than the first known, fixed rotation rate.

Example 13 includes the system of Example 10, wherein a temperature dependent bias is modelled by $k_1+k_2*FSR+k_3*FSR^2+k_4*dFSR/dt+k_5*d(\Delta T)/dt$; wherein $k_1$, $k_2$, $k_3$, $k_4$, and $k_5$ are coefficients; wherein dFSR/dt is the first derivative of FSR with respect to time; wherein $d(\Delta T)/dt$ is the first derivative of a thermal spatial gradient across the resonator; and wherein the temperature dependent scale factor is modelled by $k_6+k_7*FSR$; and where $k_6$ and $k_7$ are coefficients.

Example 14 includes the system of Example 9, further comprising: a first laser source; a second laser source; a first at least one optical coupler coupled to the first laser source and the second laser source; a second at least one optical coupler; the resonator coupled to the first at least one optical coupler and the second at least one optical coupler; a first photodetector coupled to the second at least one optical coupler; a second photodetector coupled to the second at least one optical coupler; a first resonance switching servo loop coupled to the processing circuitry, the first photodetector, and the first laser source; a second resonance switching servo loop coupled to the processing circuitry, the second photodetector, and the second laser source; and wherein the processing circuitry is further configured to determine rotation rate frequency shift which is not temperature compensated, and FSR.

The system of Example 9, wherein when determining rotation rate frequency shift and a free spectral range, the RFOG is at least one of: placed in a heater and on a rotation system.

Example 16 includes a method for correcting rotation rate output from a gyroscope due to at least one time varying parameter of at least one of a gyroscope and the gyroscope's environment, the method comprising: determining free spectral range (FSR) and rotation rate frequency shift for a rotation around a center axis of a resonator of a resonant fiber optic gyroscope (RFOG); determining a corrected rotation rate frequency shift for a rotation around the center axis of the resonator of a resonant fiber optic gyroscope (RFOG) using the determined free spectral range frequency, the determined rotation rate frequency shift, and at least one of a: bias model dependent upon the at least one time varying parameter and a scale factor model dependent upon the at least one time varying parameter.

Example 17 includes the method of Example 16, wherein the at least one time varying parameter comprises temperature.

Example 18 includes the method of Example 17, wherein a model for temperature corrected rotation rate is: (SF(FSR)*$(f_\Omega)$)–Bias(FSR), where $f_\Omega$ is the measured, uncorrected frequency shift due to rotation rate, SF(T) is a temperature dependent scale factor, Bias(T) is a temperature dependent bias, the FSR=$a_0+a_1T$, $a_0$ is the temperature independent component of the FSR, and $a_1$ is the coefficient of proportionality between FSR and a spatially averaged temperature of a path of an optical signal in the resonator.

Example 19 includes the method of Example 16, wherein determining the at least one of the bias model and the scale factor model comprises determining at least one coefficient for at least one of the models; wherein if the bias model is determined, then determining the rotation rate frequency shift and the FSR at a first known, fixed rotation rate; and wherein if the scale factor model is determined, then determining the rotation rate frequency shift and the FSR at least at a second known, fixed, non-zero rotation rate that is different than the first known, fixed rotation rate.

Example 20 includes the method of Example 17, wherein a temperature dependent bias is modelled by $k_1+k_2*FSR+k_3*FSR^2+k_4*dFSR/dt+k_5*d(\Delta T)/dt$; wherein $k_1$, $k_2$, $k_3$, $k_4$, and $k_5$ are coefficients; wherein $dFSR/dt$ is the first derivative of FSR with respect to time; wherein $d(\Delta T)/dt$ is the first derivative of a thermal spatial gradient across the resonator; wherein the temperature dependent scale factor is modelled by $k_6+k_7*FSR$; and where $k_6$ and $k_7$ are coefficients.

In various alternative embodiments, system elements, method steps, or examples described throughout this disclosure (such as the resonator switching servo loops or the feed-forward rate processor, or sub-parts thereof, for example) may be implemented on one or more computer systems, field programmable gate array (FPGA), or similar devices comprising a processor executing code to realize those elements, processes, or examples, said code stored on a non-transient data storage device. Therefore, other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A method for determining a model for correcting rotation rate output from a gyroscope due to at least one time varying parameter of at least one of a gyroscope and the gyroscope's environment, the method comprising:
whilst rotating a resonator of the gyroscope around a center axis of the resonator at least one of: a predetermined fixed rotation rate and a predetermined varying rotation rate, determining the rotation rate frequency shift for a rotation around the center axis of the resonator of the gyroscope and a free spectral range (FSR) of the gyroscope over a range of at least one of: the at least one time varying parameter and one or more orders of derivatives of the FSR with respect to time;
determining at least one of: a bias model dependent upon the at least one time varying parameter and a scale factor model dependent upon the at least one time varying parameter, where the at least one of the bias model and the scale factor model comprise at least a portion of a rotation rate model of the gyroscope dependent upon the at least one time varying parameter, and where each of the bias model and the scale factor model comprises a term dependent upon an order of the FSR or dependent upon an order of a derivative of the FSR with respect to time; and
wherein the at least one determined model is configured to correct at least one of bias and scale factor of the gyroscope.

2. The method of claim 1, wherein the at least one time varying parameter comprises temperature.

3. The method of claim 2, wherein determining the rotation rate frequency shift and the FSR further comprises determining a rotation rate frequency shift and an FSR over at least one of: a thermal spatial gradient of the resonator, and one or more orders of derivatives of thermal spatial gradient of the resonator with respect to time.

4. The method of claim 2, wherein a model for temperature corrected rotation rate is:

$$(SF(FSR)*(f_\Omega))-Bias(FSR),$$

where $f_\Omega$ is the measured, uncorrected frequency shift due to rotation rate,
SF(T) is a temperature dependent scale factor,
Bias(T) is a temperature dependent bias,
the $FSR=a_0+a_1T$,
$a_0$ is the temperature independent component of the FSR, and
$a_1$ is the coefficient of proportionality between FSR and a spatially averaged temperature of a path of an optical signal in the resonator.

5. The method of claim 1, wherein determining the at least one of the bias model and the scale factor model comprises determining at least one coefficient for at least one of the models;
wherein if the bias model is determined, then determining the rotation rate frequency shift and the FSR at a first known, fixed rotation rate; and
wherein if the scale factor model is determined, then determining the rotation rate frequency shift and the FSR at least at a second known, fixed, non-zero rotation rate that is different than the first known, fixed rotation rate.

6. The method of claim 1, further comprising storing the determined at least one model in the gyroscope.

7. The method of claim 2, wherein a temperature dependent bias is modelled by $k_1+k_2*FSR+k_3*FSR^2+k_4*dFSR/dt+k_5*d(\Delta T)/dt$;
wherein $k_1$, $k_2$, $k_3$, $k_4$, and $k_5$ are coefficients;
wherein $dFSR/dt$ is a first derivative of the FSR with respect to time;
wherein $d(\Delta T)/dt$ is a first derivative of a thermal spatial gradient across the resonator;
wherein the temperature dependent scale factor is modelled by $k_6+k_7*FSR$; and
wherein $k_6$ and $k_7$ are coefficients.

8. The method of claim 1, wherein when determining rotation rate frequency shift and a free spectral range, the RFOG is at least one of: placed in a heater and on a rotation system.

9. A system, comprising:
processing circuitry, configured to correct rotation rate output from a gyroscope due to at least one time varying parameter of at least one of a gyroscope and the gyroscope's environment, by:
determining a free spectral range (FSR) and a rotation rate frequency shift for a rotation around a center axis of a resonator of a resonant fiber optic gyroscope (RFOG); and
determining a corrected rotation rate frequency shift for a rotation around the center axis of the resonator of a resonant fiber optic gyroscope (RFOG) using the determined free spectral range frequency, the determined rotation rate frequency shift, and at least one of a: bias model dependent upon the at least one time varying parameter and a scale factor model dependent upon the at least one time varying parameter, where each of the bias model and the scale factor model comprises a term dependent upon an order of the FSR or dependent upon an order of a derivative of the FSR with respect to time.

10. The system of claim 9, wherein the at least one time varying parameter comprises temperature.

11. The system of claim 10, wherein a model for temperature corrected rotation rate is:

$$(SF(FSR)*(f_\Omega))-Bias(FSR),$$

where $f_\Omega$ is the measured, uncorrected frequency shift due to rotation rate,
SF(T) is a temperature dependent scale factor,
Bias(T) is a temperature dependent bias,
the $FSR=a_0+a_1T$,
$a_0$ is the temperature independent component of the FSR, and
$a_1$ is the coefficient of proportionality between the FSR and a spatially averaged temperature of a path of an optical signal in the resonator.

12. The system of claim 9, wherein determining the at least one of the bias model and the scale factor model comprises determining at least one coefficient for at least one of the models;
wherein if the bias model is determined, then determining the rotation rate frequency shift and the FSR at a first known, fixed rotation rate; and
wherein if the scale factor model is determined, then determining the rotation rate frequency shift and the FSR at least at a second known, fixed, non-zero rotation rate that is different than the first known, fixed rotation rate.

13. The system of claim 10, wherein a temperature dependent bias is modelled by $k_1+k_2*FSR+k_3*FSR^2+k_4*dFSR/dt+k_5*d(\Delta T)/dt$;
wherein $k_1$, $k_2$, $k_3$, $k_4$, and $k_5$ are coefficients;
wherein dFSR/dt is a first derivative of the FSR with respect to time;
wherein $d(\Delta T)/dt$ is a first derivative of a thermal spatial gradient across the resonator; and
wherein the temperature dependent scale factor is modelled by $k_6+k_7*FSR$; and
where $k_6$ and $k_7$ are coefficients.

14. The system of claim 9, further comprising:
a first laser source;
a second laser source;
a first at least one optical coupler coupled to the first laser source and the second laser source;
a second at least one optical coupler;
the resonator coupled to the first at least one optical coupler and the second at least one optical coupler;
a first photodetector coupled to the second at least one optical coupler;
a second photodetector coupled to the second at least one optical coupler;
a first resonance switching servo loop coupled to the processing circuitry, the first photodetector, and the first laser source;
a second resonance switching servo loop coupled to the processing circuitry, the second photodetector, and the second laser source; and
wherein the processing circuitry is further configured to determine a rotation rate frequency shift which is not temperature compensated, and the FSR.

15. The system of claim 9, wherein when determining rotation rate frequency shift and a free spectral range, the RFOG is at least one of: placed in a heater and on a rotation system.

16. A method for correcting rotation rate output from a gyroscope due to at least one time varying parameter of at least one of a gyroscope and the gyroscope's environment, the method comprising:
determining a free spectral range (FSR) and a rotation rate frequency shift for a rotation around a center axis of a resonator of a resonant fiber optic gyroscope (RFOG);
determining a corrected rotation rate frequency shift for a rotation around the center axis of the resonator of a resonant fiber optic gyroscope (RFOG) using the determined free spectral range frequency, the determined rotation rate frequency shift, and at least one of a: bias model dependent upon the at least one time varying parameter and a scale factor model dependent upon the at least one time varying parameter, where each of the bias model and the scale factor model comprises a term dependent upon an order of the FSR or dependent upon an order of a derivative of the FSR with respect to time.

17. The method of claim 16, wherein the at least one time varying parameter comprises temperature.

18. The method of claim 17, wherein a model for temperature corrected rotation rate is:

$$(SF(FSR)*(f_\Omega))-Bias(FSR),$$

where $f_\Omega$ is the measured, uncorrected frequency shift due to rotation rate,
SF(T) is a temperature dependent scale factor,
Bias(T) is a temperature dependent bias,
the $FSR=a_0+a_1T$,
$a_0$ is the temperature independent component of the FSR, and
$a_1$ is the coefficient of proportionality between the FSR and a spatially averaged temperature of a path of an optical signal in the resonator.

19. The method of claim 16, wherein determining the at least one of the bias model and the scale factor model comprises determining at least one coefficient for at least one of the models;
wherein if the bias model is determined, then determining the rotation rate frequency shift and the FSR at a first known, fixed rotation rate; and
wherein if the scale factor model is determined, then determining the rotation rate frequency shift and the FSR at least at a second known, fixed, non-zero rotation rate that is different than the first known, fixed rotation rate.

20. The method of claim 17, wherein a temperature dependent bias is modelled by $k_1+k_2*FSR+k_3*FSR^2+k_4*dFSR/dt+k_5*d(\Delta T)/dt$;

wherein $k_1$, $k_2$, $k_3$, $k_4$, and $k_5$ are coefficients;

wherein dFSR/dt is a first derivative of the FSR with respect to time;

wherein $d(\Delta T)/dt$ is a first derivative of a thermal spatial gradient across the resonator;

wherein the temperature dependent scale factor is modelled by $k_6+k_7*FSR$; and where $k_6$ and $k_7$ are coefficients.

* * * * *